J. HOOD & S. H. REYNOLDS.
DENTAL FOIL CONDENSER.

No. 189,735. Patented April 17, 1877.

UNITED STATES PATENT OFFICE.

JOHN HOOD AND STEPHEN H. REYNOLDS, OF BOSTON, MASSACHUSETTS.

IMPROVEMENT IN DENTAL-FOIL CONDENSERS.

Specification forming part of Letters Patent No. 189,735, dated April 17, 1877; application filed October 25, 1876.

*To all whom it may concern:*

Be it known that we, JOHN HOOD and STEPHEN H. REYNOLDS, of the city of Boston, county of Suffolk, and State of Massachusetts, have invented certain new and useful Improvements in the Method of Condensing and Preparing Foil for Dentists' Use; and we do hereby declare the following to be such a full, clear, and exact description thereof as will enable others skilled in the art to which the invention pertains to make and use the same, reference being had to the accompanying drawings, forming a part of this specification, and to the letters of reference marked thereon, similar letters indicating corresponding parts in the different figures.

The object of this invention is to afford a ready, cheap, and effective method of converting the foil used by dentists in plugging teeth into suitably-condensed cylinders of proper size for insertion into the cavities to be filled; and it consists in first rolling the foil into long cylinders, care being taken to have them solid, leaving no hole in the middle, which are then placed between two suitably-grooved holders, and cut into pieces of the desired length by a series of saws, operating through transverse slits in the holders, as will be hereinafter fully described, and then specifically pointed out in the claims.

Figure 1:
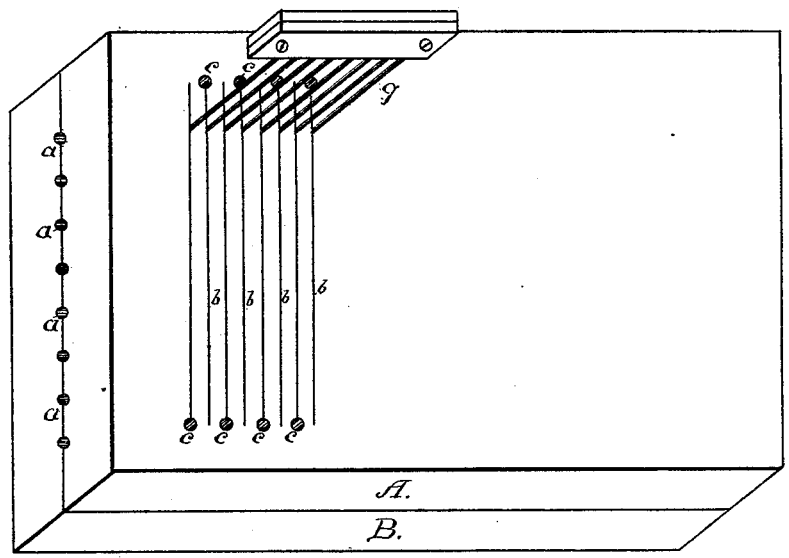
Figure 2:
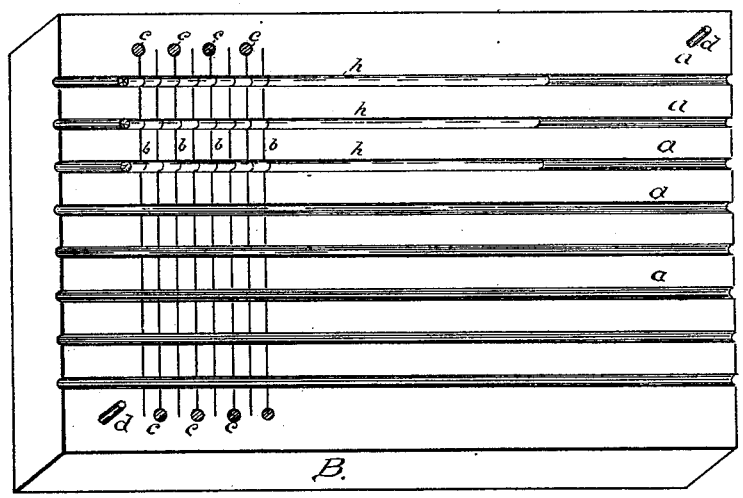

In the drawings, Figure 1 shows the grooved holders closed, and with the saws by which the long rolls of foil lying in the grooves between them are cut into short lengths in their proper position in the guide-slits. Fig. 2 shows one of the holders with its grooves partly filled by rolls of foil which have been cut into short cylinders ready for use.

The grooved holders A and B are preferably formed of some hard and durable wood, but may be of other material, if desired. One of them, B, is provided with guide-pins $d$, which enter corresponding holes in the part A, and serve to preserve the proper relation between the parts when they are placed together. The grooves $a$ are of such size as to hold snugly the rolls of foil to be cut, so that the action of the saws upon them shall not cause them to shake about or be displaced. A series of parallel guiding-slits, $b$, are formed in the holders at right angles to the grooves $a$, the distance between them being equal to the length of the cylinders of foil it is desired to form. These slits act as guides to the saws $g$, which are passed through them and reciprocated, when they act upon the rolls, not like a knife, forming a clear cut, but tearing, as it were, their way through the foil, causing the ends of the cylinders to present a rough surface instead of a smooth one, thus causing them to unite and adhere much more firmly to each other when pressed into a cavity than the cylinders with cleanly-cut ends are found to do.

Foil of different kinds may be worked in this way, it being only necessary to envelop the roll of gold, tin, or other foil with a layer of cohesive gold-foil before sawing it into cylinders, the action of the saws dragging the fibers of cohesive gold over the ends of the cylinders in such a manner as to cause their ready union when pressed together.

The method of procedure in forming these cylinders is as follows: The sheets of foil are rolled between two cushions into rolls $h$, the different kinds of foil being used according to the product required. These rolls $h$ are then placed in the grooves $a$ of that part of the holder marked B. The part A is then placed in position, after which the saws $g$ are passed through the holes $c$, and a reciprocating motion imparted to them by hand, or through the agency of an ordinary scroll-sawing machine, when they are allowed to advance along the guide-slits $b$, either through a forward movement of their own or by a movement of the roll-holders toward them, until they have passed along the slits from end to end, when, upon removing them and separating the holders, the rolls of foil will be found divided into cylinders of proper size and shape for use.

We are aware of the patent of R. S. Williams, No. 137,747, reissued April 21, 1874, and hereby disclaim the invention covered thereby.

Having thus described our invention, we claim as new, and desire to secure by Letters Patent of the United States, the following:

1. The holders A and B, provided with longitudinal semicircular grooves $a$, for holding the rolls of foil, and transverse slits $b$, which act as guides for the saws $g$, substantially as and for the purpose set forth.

2. The process of preparing pellets of foil for dentists' use, consisting of the following steps: First rolling the foil between cushions into suitable rolls, placing these rolls within the longitudinal grooves $a$ of the holders A B, and then dividing the rolls into pellets by the saws $g$, guided in their action upon the rolls of foil by the transverse slits $b$, all substantially as hereinbefore set forth.

In testimony whereof we have hereunto affixed our signatures this 9th day of October, 1876, in presence of two witnesses.

JOHN HOOD.
STEPHEN H. REYNOLDS.

Witnesses:
JAS. B. BELL,
E. B. GLEASON.